United States Patent [19]

Gualtieri et al.

[11] Patent Number: 4,646,558

[45] Date of Patent: Mar. 3, 1987

[54] METHOD FOR LEAK TESTING AIR FILTERS

[75] Inventors: Peter J. Gualtieri, Syracuse; Roger T. Goulet, Liverpool, both of N.Y.

[73] Assignee: Cambridge Filter Corp., Syracuse, N.Y.

[21] Appl. No.: 730,197

[22] Filed: May 3, 1985

Related U.S. Application Data

[62] Division of Ser. No. 550,611, Nov. 10, 1983, Pat. No. 4,548,068.

[51] Int. Cl.⁴ .............................................. G01M 3/20
[52] U.S. Cl. ..................................... 73/40.7; 55/270; 55/18; 55/418
[58] Field of Search ............... 73/40.7; 55/481, 270, 55/274, 20, 21, 418, 18

[56] References Cited

U.S. PATENT DOCUMENTS

| | | | |
|---|---|---|---|
| 3,395,514 | 8/1968 | Bub | 73/40.7 |
| 3,522,724 | 8/1970 | Knab | 73/40.7 |
| 4,055,075 | 10/1877 | Allan et al. | 73/40.7 |
| 4,061,082 | 12/1977 | Shuler | 98/40.11 |
| 4,324,568 | 4/1982 | Wilcox et al. | 73/40.7 |
| 4,548,068 | 10/1985 | Gualtieri et al. | 73/40.7 |

Primary Examiner—Stewart J. Levy
Assistant Examiner—Hezron E. Williams
Attorney, Agent, or Firm—Charles S. McGuire

[57] ABSTRACT

A HEPA-type, downflow air filter module is disclosed, having a damper supported upon a hollow tube for adjustable movement relative to an opening through which air enters the enclosed chamber or plenum above the filter media. The hollow damper support tube is axially aligned with a passageway between upstream and downstream sides of the center board which conventionally separates the media core into two halves in such filter modules. The passageway is normally sealed by a plug which may be removed from the downstream side of the module for measuring and adjusting air flow into the module, as controlled by the position of the damper which may be adjusted while air flow is being measured. The filter construction also permits leak testing of the filter by injection of test smoke from the downstream side, through the center board passageway and hollow damper tube, with simultaneous monitoring of the smoke concentration on the upstream side, thereby insuring that the desired level of smoke concentration on the upstream side of the media is reached prior to scanning the downstream side for the presence of particles to detect leaks.

11 Claims, 8 Drawing Figures

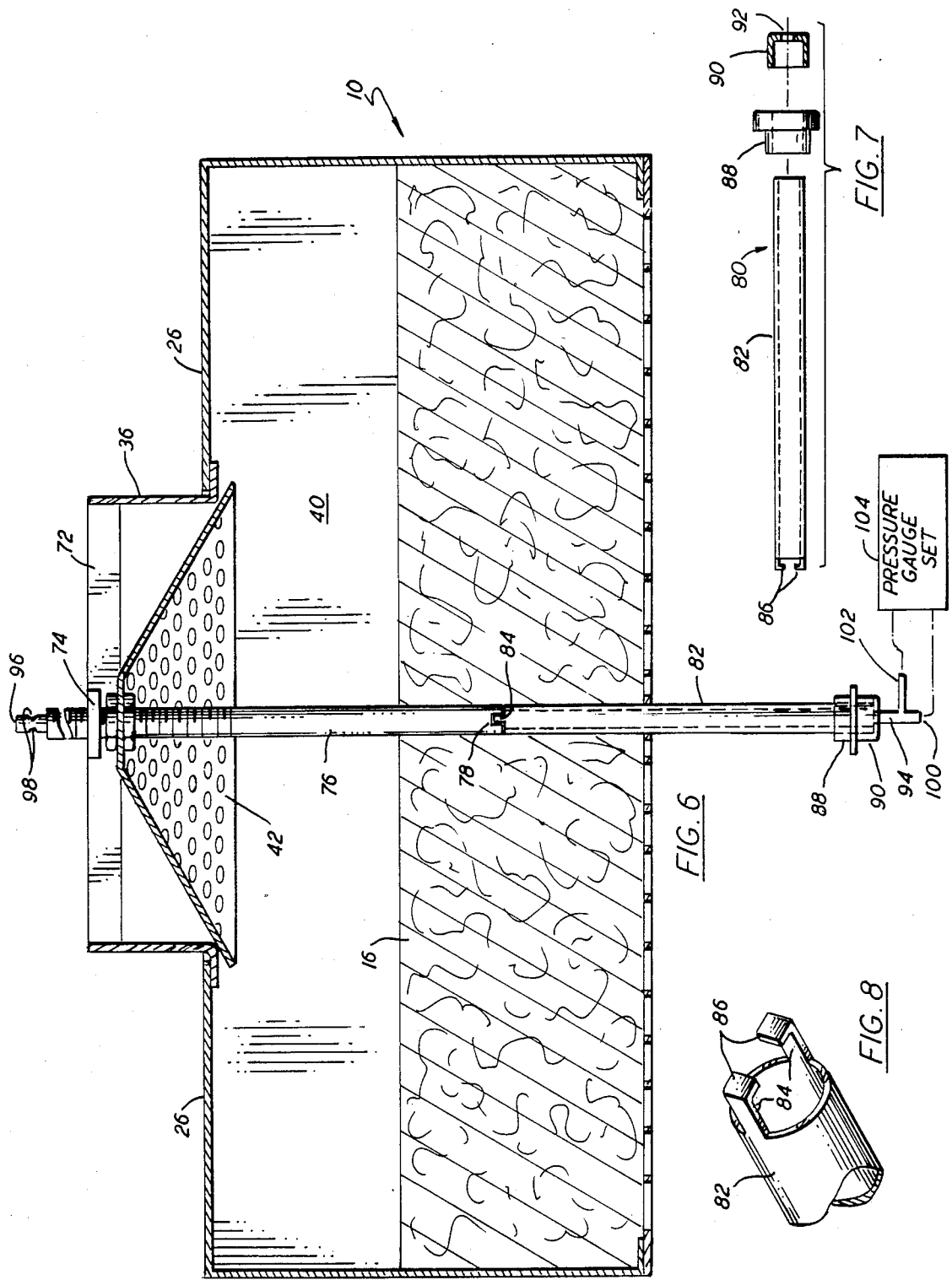

4,646,558

METHOD FOR LEAK TESTING AIR FILTERS

REFERENCE TO RELATED APPLICATIONS

This is a division of application Ser. No. 550,611, filed 11/10/83, now U.S. Pat. No. 4,548,068.

BACKGROUND OF THE INVENTION

The present invention relates to novel constructions of air filter units of the downflow, HEPA type, and to methods of measuring and adjusting air flow into such filter constructions and of performing leak testing thereof.

In locations requiring air substantially free of all foreign matter, such as for industrial process or medical applications, it is a common practice to provide high efficiency filter modules having media cores capable of removing essentially all particles down to sub-micron size through which all entering air passes. The media is sealed about its periphery to housing structure including a center board dividing the media core into two halves and defining an enclosed chamber or plenum on the upstream side of the media.

Incoming air is directed by a fan through suitable ductwork to the individual filter modules which are suitably supported and sealed to surrounding structure with the downstream face of the filter media forming a portion of the ceiling of the room to which the filtered air is supplied. Air from the ductwork enters the enclosed space on the upstream side of the media through an opening in the top wall of the housing structure. The rate of air flow into the filter plenum is controlled by the position of a damper mounted for adjustable movement with respect to the opening through which air enters from the ductwork.

It is desireable to test such filter modules periodically after installation for leaks in order to verify that the required level of filtration efficiency is being maintained. This has been done in the past by developing standard test fluids, such as D.O.P. smoke, which are placed in suitable concentrations on the upstream side of the filter core while scanning the downstream side with sensing equipment to detect the presence of particles which have leaked through or around the media. Although such functions as dmper adjustment, air pressure measurement, and test smoke injection and upstream concentration monitoring may be performed from the upstream side of the media, they normally may be more conveniently carried out from the downstream side, assuming suitable provision is made in the filter module construction.

In U.S. Pat. No. 3,522,724, three passageways are formed through the center board of the filter housing, each providing communication between the upstream and downstream sides of the media. The slotted lower end of an elongated rod may be engaged by a screwdriver inserted through the center opening, rotation of the rod serving to adjust the position of the damper, thereby changing the rate of air flow into the filter plenum. For leak testing, test smoke is injected directly into the filter plenum through one of the other openings while the concentration of the smoke on the upstream side of the media is monitored through the third opening. Thus, in order to adjust the position of the damper, inject test smoke into the filter plenum, and monitor the concentration of the smoke within the plenum, three separate and distinct passageways through the media, or, more commonly, the center board dividing the media into two halves, have heretofore been employed.

Each of the three openings is sealed, of course, when not in use for the intended purpose by a plug removable from the downstream side of the filter unit. However, the more openings or passageways which are provided between upstream and downstream sides of the media, the greater the possibility of leaks occurring when the filter is in use and such passageways are presumably sealed. While injecting the test smoke directly into the filter plenum from the downstream side has the advantage of confining the smoke to a single plenum, it is difficult to distribute such smoke evenly over the upstream side; consequently, the concentration of smoke monitored through an opening at a discrete point above the filter media may not accurately reflect the concentration of smoke over the entire upstream face. Furthermore, while adjustment of the damper position from the downstream side of the filter unit to control the rate of air flow from the ductwork into the plenum is convenient, no means have been provided in such filter units for taking measurements from the downstream side indicating the actual rate of air flow at any given time.

A principal object is to provide a HEPA-type air filter having improved leak testing features; more specifically, this object is to provide means for injecting test smoke from the downstream to the upstream side of the media which assures uniform distribution of the smoke over the upstream face.

A still further object is to provide a HEPA-type air filter construction having a single passageway through the media center board through which a wand may be inserted for injection of test smoke from downstream to upstream sides of the filter media while simultaneously monitoring the concentration of such smoke on the upstream side through the same passageway.

Another object is to provide novel and improved methods of effecting damper adjustment, making air pressure and flow measurement, injecting test smoke and monitoring the upstream concentration thereof for leak testing in downflow, HEPA-type air filter modules.

Other objects will in part be obvious and will in part appear hereinafter.

SUMMARY OF THE INVENTION

The invention comprises an air filter construction having the usual filter core of pleated media divided by a center board, sealingly mounted in a housing having an enclosed plenum above the media with an upper, centrally disposed air inlet opening and a damper mounted for adjustable movement with respect thereto, with novel features fulfilling the aforementioned objects. Such novel features include a hollow tube axially aligned with a single passageway through the media center board and operatively connected to the damper to effect adjusting movement thereof in response to rotation of the tube. In the preferred embodiment, the damper is conical in shape, perforated and supported directly upon the hollow tube.

The lower end of the damper support tube is accessible for engagement by an adjusting tool inserted through the passageway, and a pitot tube probe connected to air pressure measurement apparatus may be inserted through the passageway and damper support tube to make pressure measurements in the duct above the module. By making the adjusting tool in the form of a second hollow tube, axially aligned with the damper support tube when extending through the passageway with adjoining end portions of the two tubes operatively engaged, the pitot tube may be extended through both tubes and pressure readings taken simultaneously with moving the tool to effect adjusting movement of the damper.

The hollow damper support tube may also be used for insertion of a hollow wand, connected to a conventional test smoke generator, for injecting smoke from the downstream side of the filter into the ductwork above the damper. The smoke will be carried by the air flowing from the ductwork into the filter plenum, over the damper and throuh the perforations therein, being mixed well with the incoming air and distributed evenly over the upstream face of the media. Further unique structure permits the upstream concentration of the test smoke to be monitored through the same, single, center board passageway. Leak testing is then performed in the usual manner by scanning the downstream face of the media with apparatus adapted to detect the presence of smoke particles which have passed through the filter.

These and other unique features of the filter construction and the methods of air pressure/flow rate measurement and leak testing made possible thereby will be more readily understood from the following detailed description taken in connection with the accompanying drawings.

BRIEF DESCRIPTION OF THE DRAWINGS

FIG. 6 is an elevational view, in section through the center, of the filter construction incorporating the portion shown in FIG. 5, and illustrating the preferred method of damper adjustment and measurement of air flow controlled thereby;

FIG. 7 is an exploded perspective view of the adjusting tool shown in FIG. 6; and FIG. 8 is an enlarged, fragmentary, perspective view of an end portion of the tool of FIG. 7.

DETAILED DESCRIPTION

Figure 1:
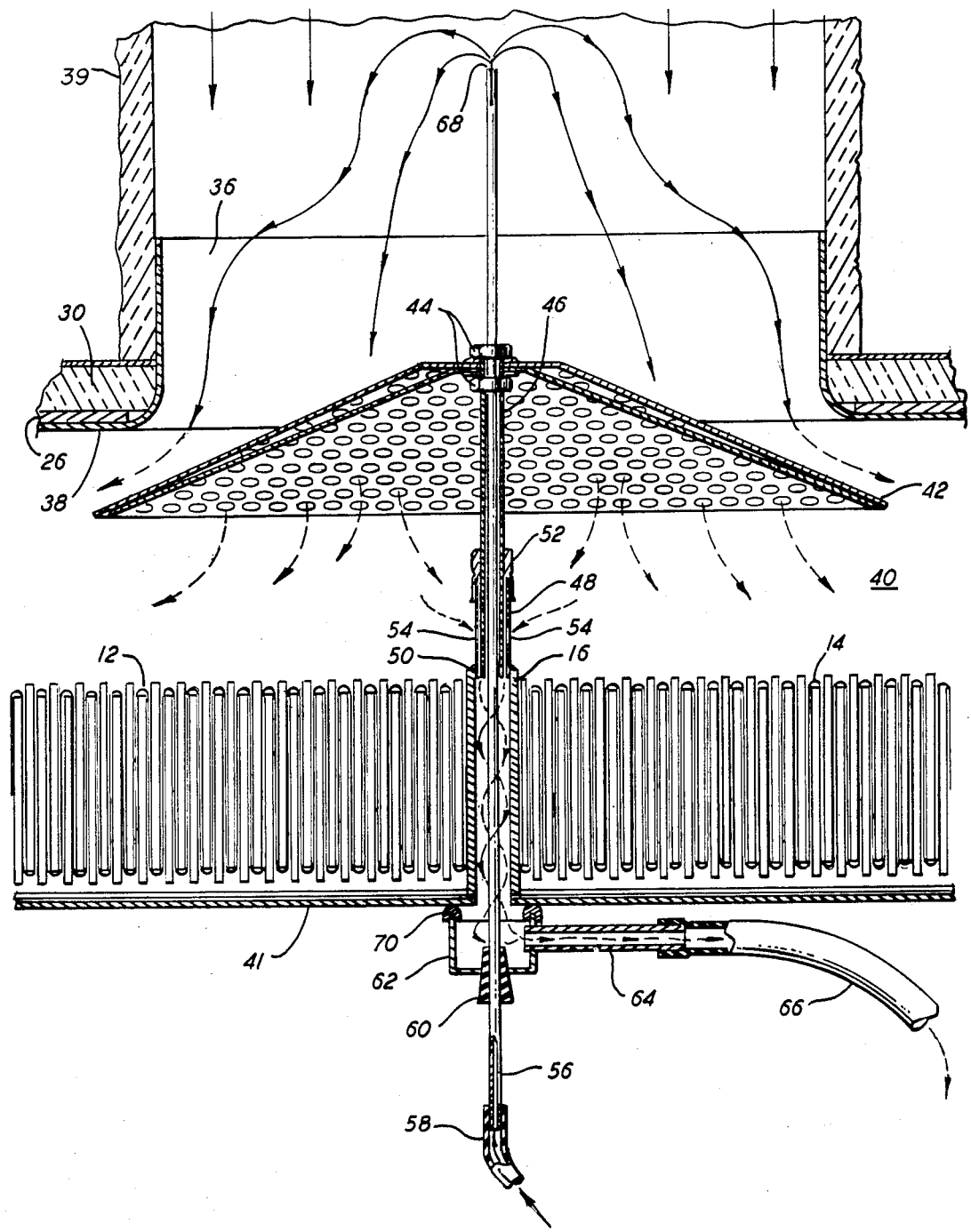
FIG. 1 is a fragmentary elevational view, in section through the center, of a filter construction embodying various constructional features of the invention, and illustrating the preferred method of leak testing thereof.
Figure 2:
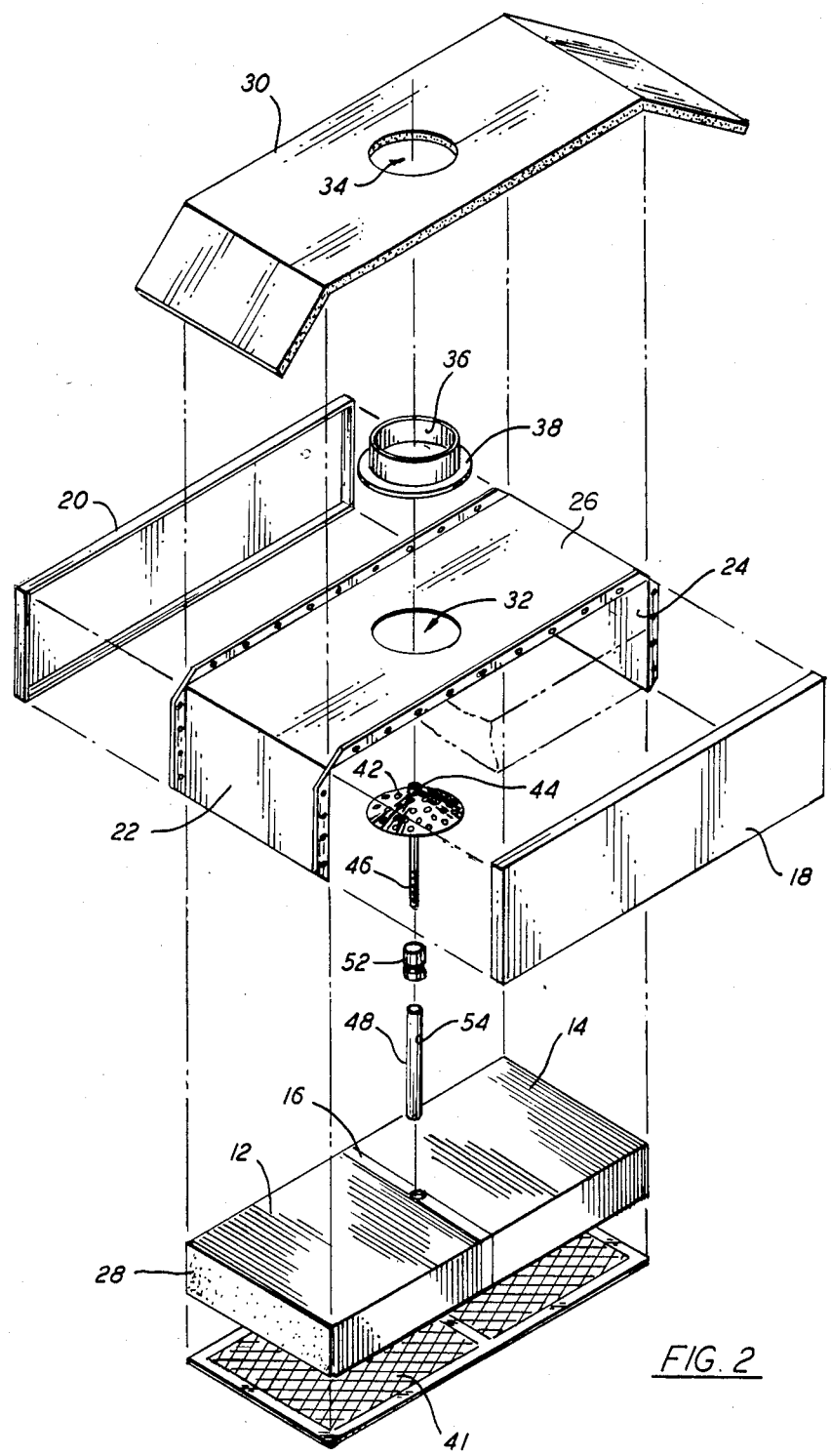
FIG. 2 is an exploded perspective view of the filter construction of FIG. 1.
Figure 3:
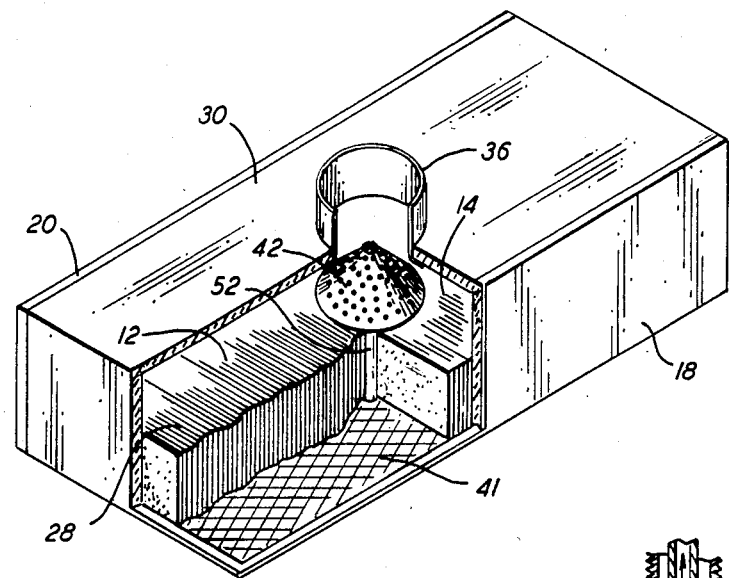
FIG. 3 is an assembled, perspective view, with portions broken away, thereof.
Figure 4:
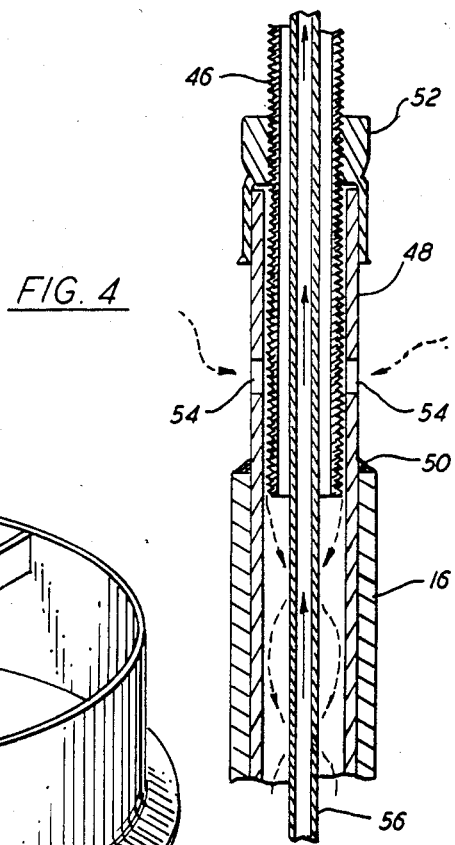
FIG. 4 is an enlarged, fragmentary, elevational view of a portion of the filter construction of FIGS. 1-3.
Figure 5:
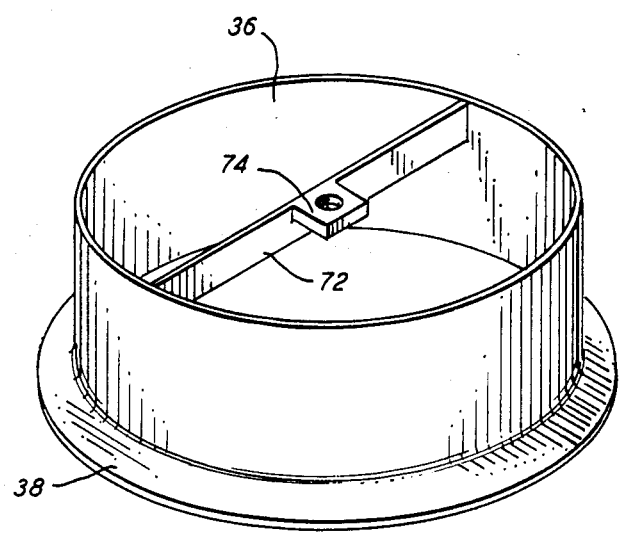
FIG. 5 is a perspective view of an element of the filter construction, including an alternate form of the construction.

Referring now to the drawings, in FIGS. 1-3 and 6 is shown an air filter module, denoted generally by reference numeral 10, in FIG. 6. A filter core is formed in conventional fashion by pleating in accordian or zig-zag fashion first and second sheets of filter media 12 and 14, each continuously sealed along one side to center board 16, which thus divides the pleated media into two halves. The opposite sides of each pleat are maintained in spaced relation by corrugated spacers, in accordance with conventional practise for such filters. The filter core is enclosed by a box-like housing or hood which may be fabricated in a number of ways, the illustrated form including side panels 18 and 20, end panels 22 and 24, and top wall 26.

Media sheets 12 and 14 are sealed continuously on all four sides to the side and end panels of the hood. Since end pleat 28 and the pleat at the opposite end provide continuous surfaces, they may be sealed to end panels 22 and 24 by a continuous bead of a suitable adhesive. The same applies to the sealing of media sheets 12 and 14 to center board 16. The zig-zag edges of the media are preferably completely enclosed is a layer of the adhesive, which may be accomplished by using side panels 18 and 20 as shallow pans into which a layer of liquid adhesive is poured. The complete edges of the media are immersed in the adhesive, which then hardens to form the continuous seal in the general manner described in U.S. Pat. No. 4,227,953.

A layer of insulation 30 is provided in covering relation to the top and end walls of the housing. Centrally disposed openings 32 and 34 are formed in top wall 26 and insulation layer 30, respectively. Cylindrical collar 36 curves smoothly outward around its lower periphery to flange 38, in a plane perpendicular to the central axis of the collar. When asembled, collar 36 extends through openings 32 and 34 with flange 38 on the lower side of top wall 26, as shown in FIG. 1, and tack welded thereto. The dimensions and configuration of the housing are such that an enclosed space or plenum 40 is provided on the upstream side of the filter core.

Cylindrical duct section 42 is connected to collar 36 as shown in FIG. 1 to supply incoming air to plenum 40. In the usual applications, a plurality of filter modules 10 will be suspended by and sealed to suitable support structure above the room or other space to which filtered air is to be supplied, forming all or part of the ceiling, the room being otherwise sealed against incoming air. The cylindrical ductwork sections connected at one end to the filter modules are normally connected at the other end to a larger duct, forming an incoming air plenum with a blower or fan at the inlet. Perforated aluminum screen 41 is attached to the housing, in covering relation to the downstream media face, also in conventional fashion.

Turning now to the unique constructional features of the present invention, the rate of air flow from duct 39 into plenum 40 is controlled by the position of damper 42, preferably conical in shape and perforated over substantially its entire surface, with respect to the opening in collar 36. Damper 42 is fixedly supported by weld nuts 44 upon hollow damper support tube 46 at a position adjacent to the upper end therof. Tube 46 is externally threaded from the lower end for a portion of its length. In the embodiment of FIGS. 1-4, a second hollow tube 48 extends at least partially through a passageway between the upstream and downstream sides of the filter core, through center board 16 and is sealed to the upper side thereof by a bead of sealant 50.

Threaded fitting 52 is attached to the upper end of tube 48, within plenum 40 and the lower end of tube 46 is threaded into fitting 52, tube 46 thereby being supported upon tube 48 for axial movement in response to rotation of tube 46. One or more openings 54 (two of which are illustrated) are formed through the wall of tube 48 within plenum 40. The passageway through center board 16 is sealed by a plug, provided for such purpose and removable from the downstream side of the module, as shown, for example, in previously mentioned U.S. Pat. No. 3,522,724, when in operation. Removing the plug provides access to the lower end of tube 46 for rotation thereof by an adjusting tool, to effect movement of damper 42 relative to the air inlet opening in a manner explained later.

The construction just described permits leak testing of filter module 10 in a novel and unique manner, which will now be described with particular reference to FIG. 1. HEPA-type filters are commonly tested for leaks according to prescribed standards by placing a test fluid carrying at least a prescribed minimum concentration of contaminants on the upstream side of the media, i.e., within plenum 40 in the present construction, and scanning the downstream side with detection apparatus to indicate the presence of contaminants which have passed through the media. A common test fluid is that known as D.O.P. smoke, and the presence or concentration thereof may be detected or registered by a conventional photometer. D.O.P. smoke generators and photometers, both portable in nature, are commercially available from a variety of sources.

Thin, hollow wand 56 is connected by tubing 58 to a portable D.O.P. smoke generator (not shown). Wand 56 passes in a sealed engagement through resilient stopper 60 in an opening in the bottom wall of cup 62. Tubing 64 passes through an opening in the side of cup 62, being sealed thereto, and is connected by tubing 66 to a portable photometer (not shown). The outside diameter of wand 56 is such that it may be inserted through damper support tube 46, and the wand length is such that end 68 thereof is positioned above the upper end of damper tube 46, within duct 39, when fully inserted as shown in FIG. 1 with resilient lip 70 of cup 62 in sealing engagement with the module about the opening at the lower end of the passageway through center board 16.

With the leak testing equipment so positioned, the smoke generator is turned on and smoke is injected from end 68 of wand 56 above collar 36. Injecting the smoke into this area where the velocity of air moving from duct 39 into plenum 40 is high, and passing the smoke over and through damper 42 as it is drawn into the plenum, assures the best possible mixing and even distribution of the test smoke over the upstream side of the media. Plenum 40 communicates, through openings 54, tube 48, cup 62, and tubing 64 and 66 with the photometer, thus permitting measurement of the concentration of test smoke on the upstream side of the media through the same, single center board passage way used for injection of the smoke. Although the clearance between the outside and inside of tubes 46 and 48, respectively, may be small, it is sufficient even if the only path for the smoke is through the threads on the outside of tube 46.

With smoke being thus introduced into plenum 40 and the photometer sampling upstream concentration through cup 2, the photometer is adjusted for 100% per manufacturer's instructions. The smoke generator is then turned off, wand 56 is removed from cup 62 and reinserted through tubes 48 and 46 with stopper 60 sealingly engaged in the opening at the lower end of the passageway through center board 16. Cup 62 is disconnected from the photometer and the standard sampling probe which is provided as a component of the photometer is connected thereto. The smoke generator is then started again and while test smoke continues to be injected into the area above the module and carried into plenum 40, the photometer sampling probe is held in close proximity to the downstream face of the media.

The hand-held probe is movedd by the operator across the media face until the entire module 10, including the perimeter where the module rests upon the support structure (usually a suspended T-bar grid), has been scanned. The photometer will register the presence of any particles from the test smoke which have leaked through or around the media. If any leaks are found which are larger than the rated efficiency of the filter, they are sealed with an appropriate sealant such as RTV silicone.

Turning now to the second disclosed construction, (of FIGS. 5-8) wherein the same reference numerals are used to denote elements which are common to the two constructions, bar 72 extends across and is fixedly attached to the upper end of collar 36. Nut 74 is affixed to bar 72 with the nut opening coaxial with collar 36 and the single passageway through center board 16. Damper 42 is supported, as in the previously described construction, upon a hollow tube. In this construction the damper support tube is threaded from the upper instead of the lower end, and therefore denoted by reference numeral 76, although in other respects being the same as tube 46.

The lower end of tube 76 extends into the passageway through center board 16. A pair of slots, one of which is seen in FIG. 6 and denoted by reference numeral 78, extend from the lower terminal end of tube 76, on opposite sides thereof.

An adjustment tool, denoted generally by reference numeral 80, includes shank portion 82 having a pair of strips 84 extending from one end thereof with ears 86 bent inwardly from each. Molded bushing 88 is placed on the opposite end of shank 82, fitting tightly thereon, and cap 90 is secured to the shank end with a suitable adhesive or other means. Central opening 92 is formed in the end wall of cap 90. Shank 82 is of substantially the same diameter as damper support tube 76, and may thus be inserted into the passageway through center board 16 from the downstream side of module 10 for engagement of ears 86 with slots 78. Rotation of tool 80 is transmitted to tube 76, whereby the latter is moved axially due to its threaded engagement with nut 74 and the position of damper 42 is changed with respect to the air inlet opening in plenum 40 to adjust the rate of air flow.

Pressure measurements may be taken by inserting a pitot tube through hollow damper support tube 76 to obtain direct readings of the rate of air flow through the air inlet opening in collar 36 into filter plenum 40. Since adjustment tool 80 is in axial alignment with tube 76 when engaged therewith, the pitot tube may be extended through both and the rate of air flow adjusted simultaneously with taking the readings. Pitot tube 94 is first inserted through opening 92 in end cap 90 and advanced to extend through tool 80. After the sealing plug is removed from the lower end of the opening in center board 16, tool 80 is inserted and ears 84 are engaged in slots 78. Pitot tube 94 is advanced through damper tube 76 to a position such as shown in FIG. 6, with its upper end extending above damper tube 76, into the area above damper 42 and collar 36.

An opening is provided in terminal end 96 and a plurality of small openings 98 are provided through the wall of pitot tube 94 adjacent end 96. The lower portion of pitot tube 94 remains outside the lower end of tool 80, lower end 100 and side port 102 being connected to the total and static pressure taps, respectively, of pressure gauge set 104. The readings of total and static pressure are converted by the gauge set in known manner to a scale reading in cubic feet per minute of air flow in the area just above damper 42. The flow rate may be adjusted by rotating adjusting tool 80 while continuing to make air flow readings until the desired flow rate is established. While the hollow adjusting tool and pitot tube with gauge set facilitates and expedites the measurement and adjustment of the rate of air flow into module 10, the hollow damper tube may be utilized without the special adjusting tool, taking flow readings with a conventional velometer and rotating the damper tube with a screwdriver.

Although only leak testing is specifically shown and described in connection with the first construction, and only air pressure measurement in connection with the second, it is obvious that either construction could, and preferably would, include features permitting both leak testing and pressure measurement, as well as damper adjustment, to be performed from the downstream side of the filter module with only a single passageway through the center board. In the construction of FIGS. 1-4, for example, the lower end of damper support tube 46 would be slotted for engagement by an adjusting tool to rotate the tube within the threaded fitting 52 to effect adjustment of the position of damper 42. Preferably, the adjusting tool would also be in the form of a hollow tube, such as that of FIGS. 7 and 8, whereby air pressure and flow rate measurements could be made in the manner described in connection with the second construction.

Likewise, leak testing could be performed entirely from the downstream side of the filter module of FIG. 6 by injecting test smoke through a wand inserted into the passageway through centerboard 16 to extend through hollow damper tube 76 to the area above damper 42. The concentration of test smoke on the upstream side of the media could be monitored in the manner of the construction of FIGS. 1-4 by providing communication as illustrated therein between enclosed space 40 and the downstream side of the passageway through centerboard 16. That is, an additional hollow tube, surrounding the lower end of damper support tube 76 and sealed thereto, having apertures within plenum 40, would be provided and utilized with the system shown in FIG. 6. In any case, the damper is supported upon a hollow tube mounted for adjustable, axial movement with access via a single passageway through the centerboard of the media core, whether supported in a threaded coupling at the upper or lower end.

What is claimed is:

1. A method of simultaneously measuring and adjusting the rate of air flow from enclosed ductwork into an enclosed space on the upstream side of the filter core of a downflow, HEPA-type air filter through an opening on the upper side of the filter housing to which said ductwork is connected, said method comprising:
    (a) supporting damper for adjustable movement with respect to said opening to vary said rate of air flow by means of a first hollow tube affixed to said damper, coaxially disposed with respect to said opening and having a lower end accessible from the downstream side of said filter core;
    (b) supporting said first hollow tube for axial movement to effect said damper movement;
    (c) engaging said lower end of said first hollow tube with one end of a second hollow tube having a second end on the downstream side of said filter core, the engagement being such that said tubes are linearly aligned and movement of said second tube is transmitted to said first tube and said damper to effect said adjustable movement of the latter;
    (d) inserting a pitot tube through said second end of second tube to extend outside said upper end of said first tube to a position on the upstream side of said damper, outside said enclosed space;
    (e) connecting said pitot tube to an air flow meter and to obtain a reading of total and/or static pressure on the upstream side of said damper; and
    (f) moving said second tube second end to effect said adjustable movement of said damper, thereby varying said rate of air flow into said enclosed space, until said pressure reading reaches the desired value.

2. The invention according to claim 1 wherein said opening is circular and said damper is conical, having a diameter at least as great as said opening and supported on said first hollow tube coaxially with said opening.

3. The invention acccording to claim 2 wherein said first hollow tube is supported in threaded engagement with stationary mounting means and said axial movement is effected by transmitting rotation from said second hollow tube to said first hollow tube.

4. The invention according to claim 1 wherein said filter core comprises at least two sheets of pleated filter media sealingly engaged on all sides to frame means of said filter module and separated by a center board, and comprising the further steps of providing one passageway through said center board extending between the upstream and downstream sides of said media core in axial alignment with said first hollow tube, and inserting second hollow tube through said one passageway for engagement with said first hollow tube.

5. The invention according to claim 4 and comprising the further steps of inserting a sealing plug in said passageway from the downstream side of said filter module when air flow is neither being measured nor adjusted and removing said sealing plug to permit insertion of said second hollow tube through said passageway for engagement with said first hollow tube and of said pitot tube through said first and second hollow tubes when air flow is being neither measured nor adjusted.

6. The invention according to claim 5 and comprising the further step of inserting a probe through said passageway from the downstream side of said filter and reading static pressure within said enclosed space on the upstream side of said filter core.

7. The invention according to claim 4 and comprising the further steps of revoving said second hollow tube and pitot tube from said one passageway following measurement and adjustment of air flow, and inserting a hollow wand of a test smoke generator through said one passageway and said first hollow tube to a position above said damper, outside said enclosed space, and injecting a test smoke through said wand into the area above said damper for movement into said enclosed space to the upstream side of said filter core.

8. The invention according to claim 7 and including the further step of monitoring the concentration of said test smoke on the upstream side of said filter core simultaneously with injection of said test smoke into the area above said damper.

9. The invention according to claim 8 and comprising the further steps of inserting a sealing plug in said passageway when non of air flow measurement, air flow adjustment, test smoke injection, test smoke monitoring are being performed.

10. The invention according to claim 9 wherein said monitoring step is performed by providing a path from said enclosed space, through said passageway, to a detector responsive to concentrations of said test smoke.

11. The invention according to claim 10 and including the further step of scanning the downstream face of said filter core with a detector responsive to the presence of said test smoke at said downstream face.

* * * * *